Aug. 4, 1925.
J. M. MacDONALD
1,548,537
APPARATUS FOR MOLDING PLASTIC SUBSTANCES
Original Filed July 6, 1916   3 Sheets-Sheet 1
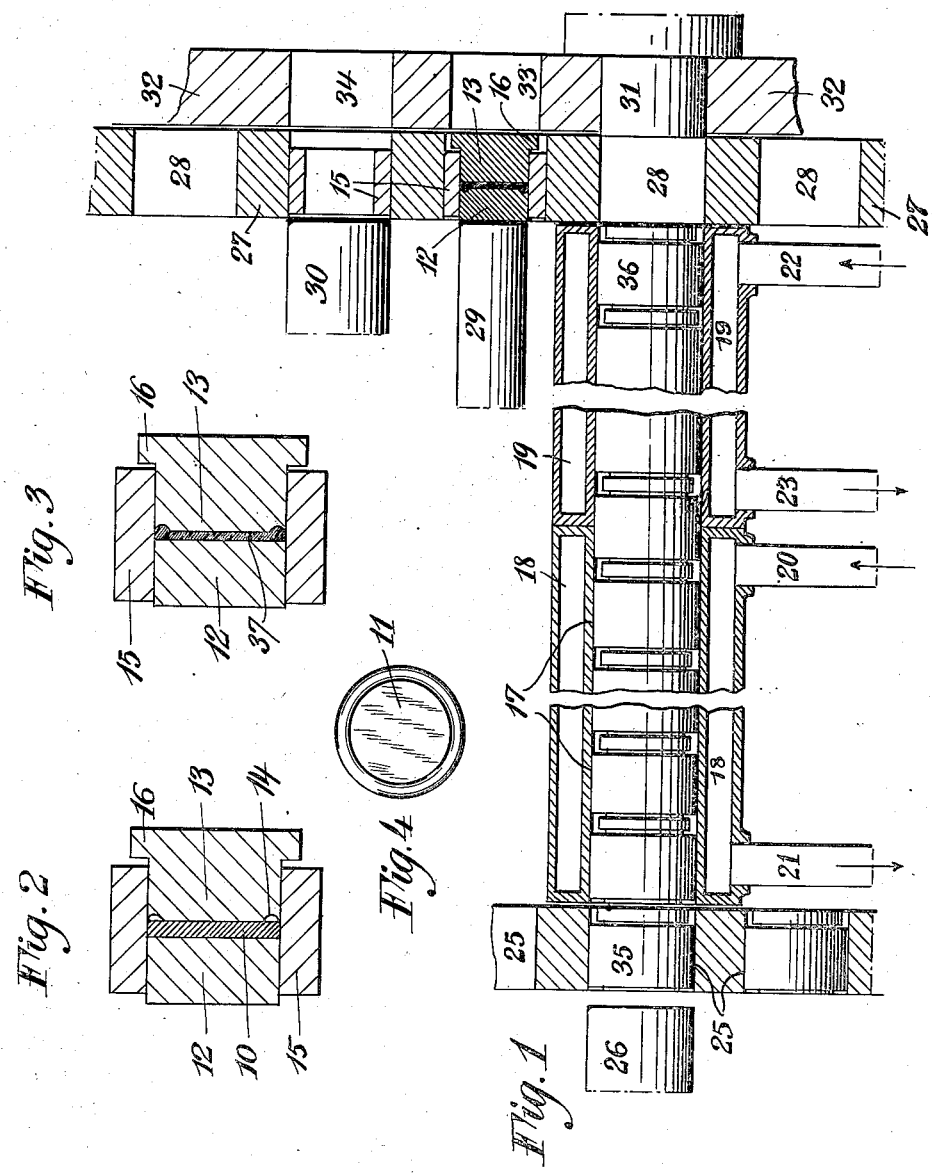

Aug. 4, 1925.
J. M. MacDONALD
1,548,537
APPARATUS FOR MOLDING PLASTIC SUBSTANCES
Original Filed July 6, 1916     3 Sheets-Sheet 2
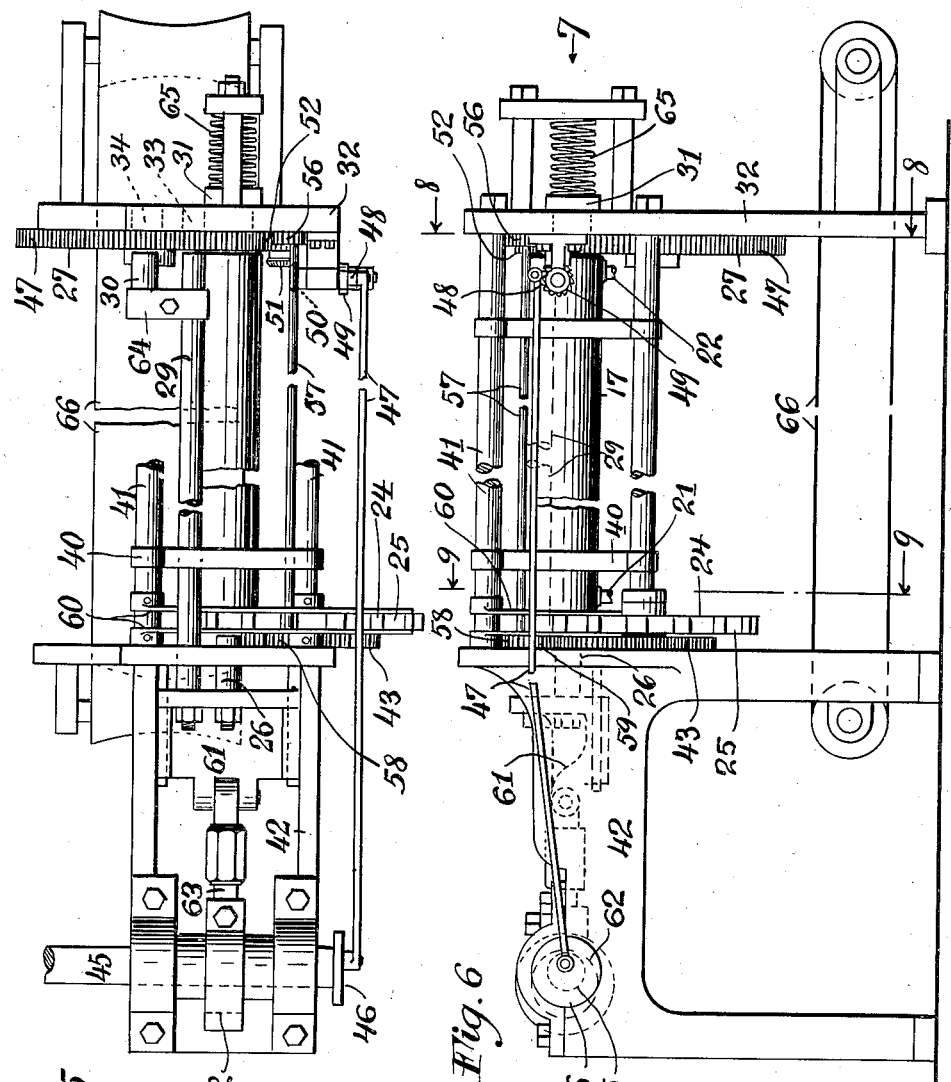

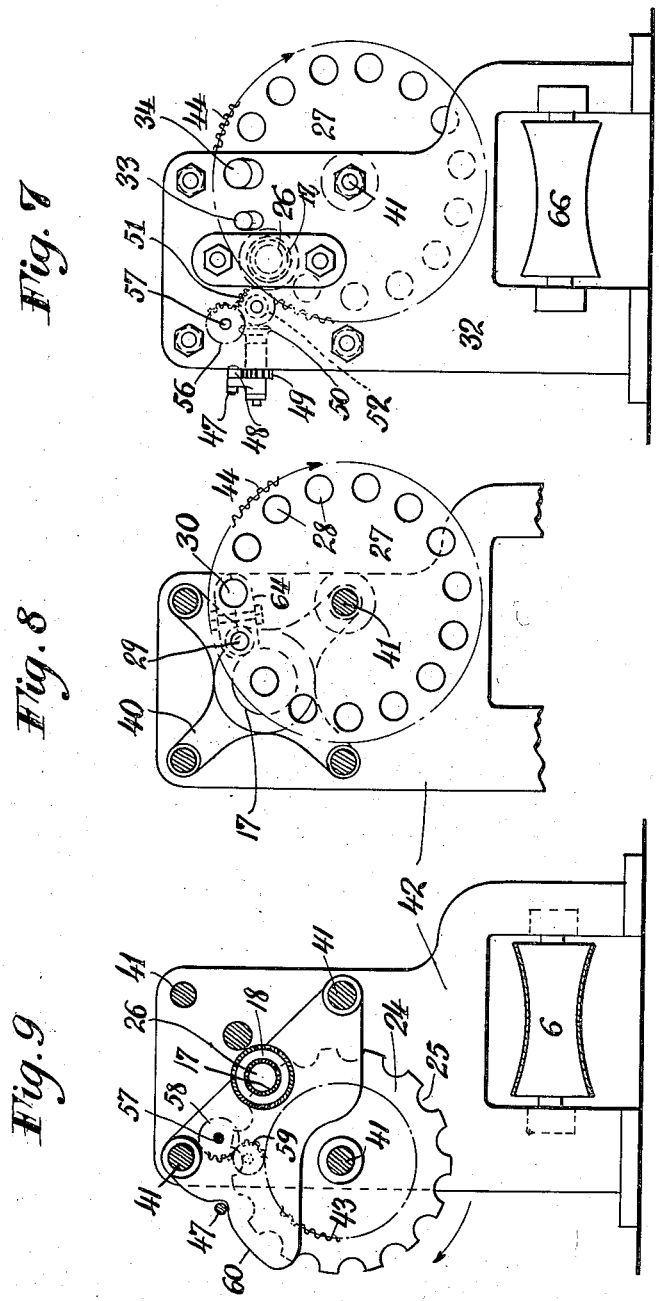

Patented Aug. 4, 1925.

1,548,537

UNITED STATES PATENT OFFICE.

JAMES M. MacDONALD, OF EAST ORANGE, NEW JERSEY, ASSIGNOR, BY MESNE ASSIGNMENTS, TO BAKELITE CORPORATION, OF NEW YORK, N. Y., A CORPORATION OF DELAWARE.

APPARATUS FOR MOLDING PLASTIC SUBSTANCES.

Original application filed July 6, 1916, Serial No. 107,751. Divided and this application filed November 28, 1916, Serial No. 133,839. Renewed November 16, 1921. Serial No. 515,691.

*To all whom it may concern:*

Be it known that I, JAMES M. MACDONALD, a citizen of the United States, and resident of East Orange, in the county of Essex and State of New Jersey, have invented certain new and useful Improvements in Apparatus for Molding Plastic Substances, of which the following is a specification.

The object of this invention is to provide a novel, generally improved, efficient and economical apparatus for molding plastic substances of the phenol resin type and other like or similar materials for the purpose of producing finished or semi-finished articles adapted for use in various arts and industries, and in accordance with a method for molding plastic substances disclosed in my pending application Serial Number 107,751 filed July 6, 1916 of which this application is a division.

It is a further particular object of the invention to provide an apparatus for molding plastic substances whereby the operation may be carried out uninterruptedly to produce the articles in large quantities at a very low cost of manufacture.

Other general and specific objects of the invention will appear as this specification proceeds.

The substances referred to are prepared in suitable preliminary form, as tablets or granules for instance, which in my improved apparatus, are subjected to the intermitting action of a compressing element, such as a stamp, plunger or ram, while exposed to the influence of a heating agent for the purpose of "curing" the substance, the compressing element also serving to move the substance through the heated area so as to obtain a large production at low cost. The substance in its finished form is thereafter cooled in any suitable manner.

Accordingly, the apparatus comprises suitable mechanism for supporting the tablets or preliminary forms, means for compressing and moving the substance, means for heating and cooling it and suitable means for feeding and removing the substance for further operations depending upon the kind of article for which the substance is to be used, and as hereinafter described and illustrated in the accompanying drawings with specific reference to the art of making buttons. It should, however, be understood, that in describing my apparatus as adapted for the making of buttons, I do so by way of example only and do not thereby intend to limit my invention except as the same is defined by the scope of the appended claims. In the said drawings—

Fig. 1 is a view somewhat diagrammatic, illustrating the main elements in the apparatus;

Figs. 2 and 3 are detail views showing the means, such as dies, for supporting and forming the substances;

Fig. 4 illustrates an article, such for example as a button blank, produced by my apparatus;

Fig. 5 is a plan view of the apparatus;

Fig. 6 is a side view of the apparatus, parts being omitted;

Fig. 7 is an end view, looking in the direction of arrow 7 in Fig. 6;

Fig. 8 is a transverse sectional view on the line 8—8 of Fig. 6; and

Fig. 9 is a transverse sectional view on the line 9—9 of Fig. 6.

I will describe my invention as applied to the making of buttons and thereafter point out its adaptability for the manufacture of other articles.

As stated in the foregoing, the substance may be had in granular form which may be measured into the dies hereinafter described, or preferably the substance is prepared in the form of tablets such as is shown at 10 in Fig. 2 of such dimensions as are required in order to produce the final button blank 11 shown in Fig. 4. The blank 11 is thereafter polished and apertured for service as a button or may be otherwise treated to produce the kind of button wanted. The preparation of the tablet may be advantageously done by tablet making machines well known to the art.

The tablet 10 is placed between two suitable dies or molds 12 and 13, which may be shaped to produce the proper blank as indicated at 14 by way of example. The dies are placed within a containing ring or circumferential die element 15, the whole forming a "unit". It will be noted that the one die member, in this case the member 13, is provided with a spacing portion 16 which may be a separate disk.

The units are placed end to end within the tube 17 provided with a steam jacket 18 and a water jacket 19. 20 and 21 represent respectively the steam inlet and outlet. 22 and 23 denote the water inlet and outlet respectively. The diameter of the tube is such as to permit the units to pass through the same without undue friction. The length of the tube depends upon the blanks to be produced and the rapidity with which the operation is carried out. The tablets must remain in the tube long enough to complete the molding and curing, and to enable them to be chilled and "set".

The units are positioned in alignment with the tube by a feeding means represented at 24 having compartments 25 into which the units are placed by the operator.

The feeding means is operated to bring a loaded compartment opposite the tube, after which a suitable compressing element such as a plunger 26 is operated to ram the unit or units into and move it through the tube 17. Continued operation results in the filling of the tube and at the start dummies may be used, if desired.

At the other end of the tube there is a removing means 27 having compartments 28 for receiving the units from the tube. 29 and 30 represent plungers for ejecting the units from the removing means. 31 is a preferably yielding, abutment supported in the frame 32 in alignment with the tube. The frame has suitable openings 33 and 34 through which the units are ejected.

The operation is as follows. The tube 17 having been heated to the required degree, the operator assembles the units and places them singly in the compartments 25. The feeding means is operated stepwise to bring a unit into alignment with the tube, and the plunger 26 is actuated to push a unit into the tube, which thus becomes filled with units as shown. When the first unit reaches the abutment 31, resistance is afforded for the passage of the units through the tube and for each unit thereafter fed into the tube, a compressing blow is received by all the units as will be understood and whereby the units are moved through the tube.

The removing means 27 is operated stepwise in unison with the feed means so that for each unit fed into the tube, a unit is removed therefrom into a position opposite the plunger 29 which thereupon is actuated to eject or discharge the dies and finished blank from the means 27 through an opening 33 in the frame, large enough to permit the dies and blank to pass but not large enough to permit passage of the ring 15. The next step in the operation moves the die ring 15 opposite the plunger 30 which ejects it through the frame opening. The plungers 26, 29 and 30 are operated simultaneously, and of course water is circulated through the jacket 19 to cool the blanks.

Fig. 1 shows the plungers in retracted position. It will be noted that there is a unit 35 in alignment with the compressing plunger 26 and the tube, there is a unit opposite the plunger 29 and a ring 15 opposite the plunger 30. The next step is the operation of the plungers from the position shown in Fig. 1. Plunger 26 rams the unit 35 into the tube, consequently pushes all the units one step ahead and the first unit 36 against the abutment 31 and at the same time the two other plungers eject the unit elements as explained. Next the plungers are retracted, the feed and removing means 24 and 27 are operated into the position shown and the operation is repeated.

It is therefore clear that the units are subjected to the continuous hammering of the plunger 26, or in other words, the tablets are being intermittently subjected to the compressing or molding action of plunger 26 while passing through the tube, at the same time being heated and then chilled or cooled. The difference between the tablet 10 and the molded blank 37 is clearly shown in Figures 2 and 3, which also illustrate one of the important features of the invention, namely, that the articles produced by this method are finished articles with respect to degree of compressibility, dimensions, form, shape and uniformity of product. It is therefore necessary that the material be shaped by means of dies and compressed within the dies in order to produce an exact uniform product. This again requires that the length of the heated portion of the tube be predetermined to insure complete compression and finished molding of the material within the dies before passing into the cooled area, and that the resistance element against which the impacts of the plunger are delivered be such that no variations in the force applied for molding any one given article occur. It will also be noted that each unit receives a predetermined equal number of impacts or blows from the plunger 26 irrespective of the force applied. This insures uniformity in the production while allowing a wide latitude in the selection of force necessary to complete the molding and compression of any particular kind of article before it is cooled. The spacing member 16 on die 13 may be a separate member and serves to keep each unit separate from the adjacent units and prevents the dies from being pushed from one ring into another during their progress through the tube.

It will be observed that the dies may be cut to form other articles than buttons, for instance, switch buttons or insulating articles, handles, containers, covers and many others, my invention being adapted for use in producing a great variety of articles by making the dies and apparatus of the proper dimensions and that therefore it is not at all limited to the making of buttons or similar articles.

The tube or container 17 is supported in any suitable manner by means of the brackets 40 mounted on the bolts 41 which connect the frame 32 with the main frame 42. The feeding means is shown as being a wheel 24 having the compartments 25 aforesaid and mounted to rotate upon a bolt 41 by means of a gear 43 secured to the hub of the wheel 24. The discharge element is shown as being a disk 27 provided with gear teeth 44, and mounted to rotate upon another bolt 41. The gear 44 is driven stepwise from the main driving shaft 45 by means of the eccentric 46, connecting rod 47, pawl and ratchet mechanism 48 and 49, bevel gears 50 and 51 and the gear 52 which meshes with the gear 44. The gear 52 also drives a gear 56 on a shaft 57 extending from frame 32 to frame 42 where it carries a second similar idler gear 58 which meshes with a gear 59 to drive the feed wheel gear 43 and the feed wheel in unison with the removing wheel or disk. 60, 60, are guard plates, Fig. 9 to prevent the units from falling out of the compartments 25 as they are being moved towards the tube. The plungers 26 and 29 are mounted in the cross head 61 operated from the driving shaft in any desired manner as by a cam 62 and pitman 63. The plunger 30 is mounted upon the plunger 29 by means of a clamp 64. The plungers are further conveniently guided in the frame and tube supports. The abutment 31 is yieldingly held against the frame 32 by a spring 65. When the dies and ring have been ejected, they fall upon a conveyer 66 which carries them back to the operator to be used again.

The apparatus may be of any suitable length necessary and correspondingly there will be a suitable number of supporting braces for the tube 17. Figures 5 and 6 show clearly the various mechanisms, the plungers being shown retracted. The operation of the apparatus of course follows the steps in the method. The cycle of the apparatus being briefly as follows. Operation of the feed wheel and removing wheel to feed and remove a unit, operation of the plungers to compress and eject as explained and so on. The conveyor is preferably operated continuously by any suitable means, not shown.

It will therefore be clear that by means of my improved apparatus, the plastic substance in tablet or other form is automatically fed to the tube and in the latter subjected to a series of blows by the compressing plunger and moved through the tube while being cured by the heat. The compression is practically finished when the cold water jacket is reached and thereafter the finished blanks are cooled. At the other end of the tube, the blanks are automatically removed and the units ejected so that the unit element falls apart and the blanks may be taken away, while the die elements are conveyed back to the starting point.

My apparatus therefore provides means for molding blanks or finished articles from plastic substances in an efficient manner, the operation being continuous and the method adapting itself to the manufacture of a great variety of useful or ornamental articles for various trades and industries.

It follows from what has been stated in the foregoing, that I do not intend to limit this invention by any specific words or terms used in this specification nor by any specific disclosure in the drawing, but I claim all the changes and modifications which legitimately come within the principle of my invention and the scope of the claims.

I claim:

1. The combination of dies for containing the substance to be molded, said dies forming a unit, a heated container adapted to receive a plurality of units at one time, means for feeding said units to the container, a continuously operated plunger for compressing and molding the substance with the said units and for moving the latter through the said container, an abutment affording a resistance to the action of the said plunger, mechanism for removing the units singly from said cylinder, a second plunger for ejecting from said removing mechanism the substance and some of the dies of said units and a third plunger for ejecting the remaining die therefrom.

2. The combination of a plurality of dies for containing the substance to be molded, said dies forming a unit, a partially heated cylinder, a feeding mechanism for conveying the units singly to the said cylinder at the one end thereof, mechanism for removing the units at the other end of said cylinder, mechanism for moving said units from the said feeding to the said removing mechanisms and for compressing the substance within the units while passing the heated portion of the cylinder, means for ejecting the units in disassembled condition from said removing mechanism and a conveyor for transporting the disassembled unit to the said feeding mechanism.

3. The combination of a plurality of dies for containing the substance to be molded, said dies forming a unit, a partially heated cylinder, a feeding mechanism for conveying the units singly to the said cylinder at the one end thereof, mechanism for removing the units at the other end of said cylinder, a plunger for moving said units from the said feeding to the said removing mechanism and for compressing the substance within the units while passing the heated portion of the cylinder, plungers for ejecting the units in disassembled condition from said removing mechanism, means for operating said plungers simultaneously, means for operating said feeding and removing mechanisms in unison and a conveyor for transporting the disassembled unit to the said feeding mechanism.

4. The combination of a plurality of dies for containing the substance to be molded, said dies forming a unit, a partially heated cylinder, a feeding mechanism for conveying the units singly to the said cylinder at the one end thereof, mechanism for removing the units at the other end of said cylinder, a plunger for moving said units from the said feeding to the said removing mechanisms, and for compressing the substance within the units while passing the heated portion of the cylinder, plungers for ejecting the units in disassembled condition from said removing mechanism, means for operating all of said plungers simultaneously, means for operating said feeding and removing mechanism in unison, a conveyor for transporting the disassembled units to the said feeding mechanism and means for cooling the unheated portion of said cylinder.

5. In a machine of the character described, the combination of means for receiving and completely enclosing the substance to be molded, said means comprising separate units consisting of a male and female die and an enclosing member, a cylinder adapted to contain said units and means for moving said units through the said cylinder in contact with each other and for compressing the said substance within the said dies.

6. The combination of means for containing and wholly enclosing the substance to be molded, said means forming units, a cylinder of uniform inside diameter and adapted to contain a plurality of said units adjacent each other, a plunger for moving said units through the said cylinder and for compressing the substance within the units, means for removing the units from the said cylinder and means for ejecting the units in disassembled condition from the said removing means.

7. The combination with a cylinder comprising an anteriorly arranged heating compartment and a posteriorly arranged cooling compartment, and an anterior feeding opening, and a posterior discharge opening, of a plurality of dies constructed to form a column when arranged in contiguous relation, each die being arranged to receive a mass of plastic material, means for feeding said dies individually into the anterior feeding opening of said cylinder, said means comprising a plunger, an abutment projecting within the posterior discharge opening of said cylinder, resilient means tensioning said abutment in the direction into the posterior discharge opening of said cylinder, means for reciprocating said plunger through an extent of movement to compress the dies fed into said cylinder and to displace said abutment against the action of said resilient means and means for individually withdrawing said dies from the posterior discharge opening of said cylinder.

8. The combination with a cylinder comprising an anteriorly arranged heating compartment and a posteriorly arranged cooling compartment and an anterior feeding opening, and a posterior discharge opening, of a plurality of dies constructed to form a column when arranged in contiguous relation, each die being arranged to receive a mass of plastic material, means for feeding said dies individually into the anterior feeding opening of said cylinder, said means comprising a plunger, an abutment projecting within the posterior discharge opening of said cylinder, resilient means tensioning said abutment in the direction into the posterior discharge opening of said cylinder, continuously operated means for operating said plunger through an extent of movement to compress the dies fed into said cylinder and to displace said abutment against the action of said resilient means and means for individually withdrawing said dies from the posterior discharge opening of said cylinder.

9. Apparatus for automatically and continuously molding articles, comprising a guideway, a plurality of dies composing a column, a plunger having continuous reciprocating motion in said guideway and adapted to intermittently advance and exert pressure upon said column, means for consecutively feeding dies containing the material to be molded into the path of movement of the plunger, an abutment at the other end of the column for resisting the pressure exerted by the plunger, and means for consecutively removing dies at the abutment end of the column.

10. Apparatus for continuously molding articles, comprising a column of dies containing the material to be molded, means including a plunger at one end and an abutment intercepting movement of the column at the other end, for intermittently subjecting the column to pressure impacts, and means operative between impacts for adding dies at one end and removing dies at the opposite end of the column.

11. Apparatus for continuously molding articles, comprising a column of dies containing the material to be molded, means including a plunger at one end and an abutment intercepting movement of the column at the other end, for intermittently subjecting the column to pressure impacts, and means operative between consecutive impacts, for simultaneously adding a die at one end and removing a die at the opposite end.

12. Apparatus for continuously molding articles, comprising a column of dies containing the material to be molded, a fixed abutment, a plunger, means adjacent the abutment intermittently operative to laterally remove the first die of the column, means adjacent the plunger intermittently operative to place an additional die in the path of the plunger and means for intermittently actuating the plunger to press the column against the abutment.

13. Apparatus for continuously molding articles, comprising a column of dies, an abutment at one end, a plunger at the other, means adjacent the abutment end of the column for moving the first die laterally out of the column, means adjacent the plunger for placing an additional die at the end of the column, means for intermittently and simultaneously operating said means, and means operative to actuate the plunger during the intervals between said operations to press the column against the abutment.

14. In a vulcanizer, the combination of an elongated cylinder open at both ends, means to force a line or stack of molds into one end of the cylinder and through the same and out at the other end, means to heat the intermediate portion of the cylinder, and means at the outlet end of the cylinder to yieldingly resist the travel of the molds through the cylinder, whereby said molds are subjected to pressure while in the cylinder, and means to cool the outlet end portion of the cylinder and the molds therein.

Signed at New York in the county of New York and State of New York this 27th day of November, A. D. 1916.

JAMES M. MacDONALD.